United States Patent
Kozuki

(10) Patent No.: US 7,700,222 B2
(45) Date of Patent: Apr. 20, 2010

(54) SEALED RECHARGEABLE BATTERY

(75) Inventor: Kiyomi Kozuki, Osaka (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 11/646,327

(22) Filed: Dec. 28, 2006

(65) Prior Publication Data

US 2007/0196730 A1    Aug. 23, 2007

(30) Foreign Application Priority Data

Feb. 23, 2006    (JP)    ................ 2006-046552

(51) Int. Cl.
*H01M 2/26*    (2006.01)
*H01M 6/10*    (2006.01)

(52) U.S. Cl. .................. 429/94; 429/161; 429/211

(58) Field of Classification Search .............. 429/94, 429/161, 211
See application file for complete search history.

(56) References Cited

U.S. PATENT DOCUMENTS

| | | | | |
|---|---|---|---|---|
| 3,490,949 A | * | 1/1970 | Deschamps | ............. 429/94 |
| 4,053,687 A | * | 10/1977 | Coibion et al. | ............. 429/94 |
| 6,376,121 B1 | * | 4/2002 | Inomata et al. | ............. 429/94 |
| 6,596,434 B1 | * | 7/2003 | Yoshinaka et al. | ............. 429/94 |
| 6,818,025 B1 | * | 11/2004 | Ura | ............. 429/94 X |
| 7,332,246 B2 | * | 2/2008 | Wiepen | ............. 429/211 |
| 7,364,817 B2 | * | 4/2008 | Lee | ............. 429/161 |

FOREIGN PATENT DOCUMENTS

JP    2000-323117    11/2000

* cited by examiner

*Primary Examiner*—Stephen J. Kalafut
(74) *Attorney, Agent, or Firm*—Wenderoth, Lind & Ponack, L.L.P.

(57) ABSTRACT

A sealed rechargeable battery has an electrode group formed by winding together a positive electrode and a negative electrode via a separator. A plurality of radial slits are provided in a welding section that is formed by an exposed section of a collector of at least one of the positive electrode and the negative electrode exposed at both ends of the electrode group. In the welding section, the exposed section is folded from the winding axis side toward the outer periphery to form a flat welding face.

6 Claims, 5 Drawing Sheets

SEALED RECHARGEABLE BATTERY

BACKGROUND OF THE INVENTION

1. Field of the Invention

The present invention relates to a current collecting structure of a sealed rechargeable battery of high power.

2. Background Art

Various portable electronic apparatuses have been recently developed. As one important key device, a sealed rechargeable battery serving as a driving power supply has been studied. Especially, a light and small battery of high energy density such as a nickel-metal-hydride rechargeable battery or a lithium-ion rechargeable battery is used in various applications, for example from a consumer-oriented apparatus including a portable phone to a driving power source for an electric vehicle or an electric tool. Especially, the lithium-ion rechargeable battery has received attention as the driving power supply, and has been actively studied in order to increase the energy density and power thereof.

A conventional sealed rechargeable battery for an electric tool or the like requiring high power has a structure shown in FIG. 7A. Electrode group 12, formed by winding positive electrode 3 and negative electrode 6 through separator 11, is stored together with an electrolyte (not shown) in closed-end case 13 made of metal.

Positive electrode 3 has collector 2 and active material layer 1 applied thereon as shown in FIG. 7B. Collector 2 has exposed section 7 having no active material layer 1 at its one end in the width direction. Negative electrode 6 similarly has collector 5 and active material layer 4 applied thereon, and collector 5 has exposed section 8 having no active material layer 4 at its one end in the width direction. Positive electrode 3 and negative electrode 6 are arranged so that exposed sections 7 and 8 lie on opposite sides, and are wound through separator 11 to form electrode group 12. At this time, exposed sections 7 and 8 are exposed at upper and lower end surfaces of electrode group 12.

As shown in FIG. 7A, collecting plate 15 is connected to exposed section 7, and collecting plate 16 is connected to exposed section 8. In this state, electrode group 12 is stored together with electrolyte in case 13, and collecting plate 16 is connected to the inner bottom face of case 13, and collecting plate 15 is connected to a terminal of sealing plate 14. This structure is called a tabless structure. In the tabless structure, the current distribution becomes uniform both in positive electrode 3 and negative electrode 6, and the discharge characteristic of the battery improves. Japanese Patent Unexamined Publication No. 2000-323117 discloses the following structure. Exposed sections 7 and 8 are folded from the outer periphery of electrode group 12 toward the winding axis side sequentially to form welding faces of collecting plates 15 and 16, and collecting plates 15 and 16 are welded to the welding faces, respectively. This method ensures the connection between exposed section 7 and collecting plate 15, and exposed section 8 and collecting plate 16, respectively.

However, when exposed sections 7 and 8 are folded from the outer periphery of electrode group 12 toward the winding axis, the diameter of the large-diameter part becomes small in order. Therefore, the folded part gets wrinkled at each winding position, and hence it is difficult to form a flat welding face. When the exposed sections are folded to form welding faces and then pressurized in order to flatten the welding faces, collectors 2 and 5 buckle at positions between active material layers 1 and 4 and the folded parts. Therefore, the welding faces are not sufficiently flattened and are not sufficiently connected to collecting plates 15 and 16, and hence a target high rate discharge characteristic cannot always be obtained. The buckling may cause distortion in active material layers 1 and 4 to peel them away from collectors 2 and 5, or may partly break active material layers 1 and 4 to disable use of them for charge and discharge. Thus, the battery characteristics including the battery capacity may degrade.

SUMMARY OF THE INVENTION

A sealed rechargeable battery of the present invention has an electrode group, an electrolyte with which the electrode group is impregnated, a first collecting plate, a second collecting plate, a case, and a sealing plate. The electrode group has a first electrode, a second electrode, and a separator interposed between the first and second electrodes. The first electrode has a first collector having a first exposed section at its one end in the width direction, and a first active material layer disposed on the first collector. The second electrode has a second collector having a second exposed section at its one end in the width direction, and a second active material layer disposed on the second collector. The first and second exposed sections are exposed on opposite sides of the electrode group. The first collecting plate is welded to a first welding section formed of the first exposed section of the wound first electrode, and the second collecting plate is welded to a second welding section formed of the second exposed section of the wound second electrode. The first collecting plate is electrically connected to the inner bottom face of the case, and the case stores the electrode group and the electrolyte. The sealing plate has a terminal connected to the second collecting plate, and is applied to an opening of the case to seal the case. A plurality of radial slits are provided in at least one of the first and second welding sections. In the part having the slits, at least one of the first and second exposed sections is folded from the winding axis side toward the outer periphery to form a flat welding face. This structure ensures connection between the flat welding face and the first and/or second collecting plates, and hence the discharge characteristic of the battery improves.

DETAILED DESCRIPTION OF THE INVENTION

Figure 1:
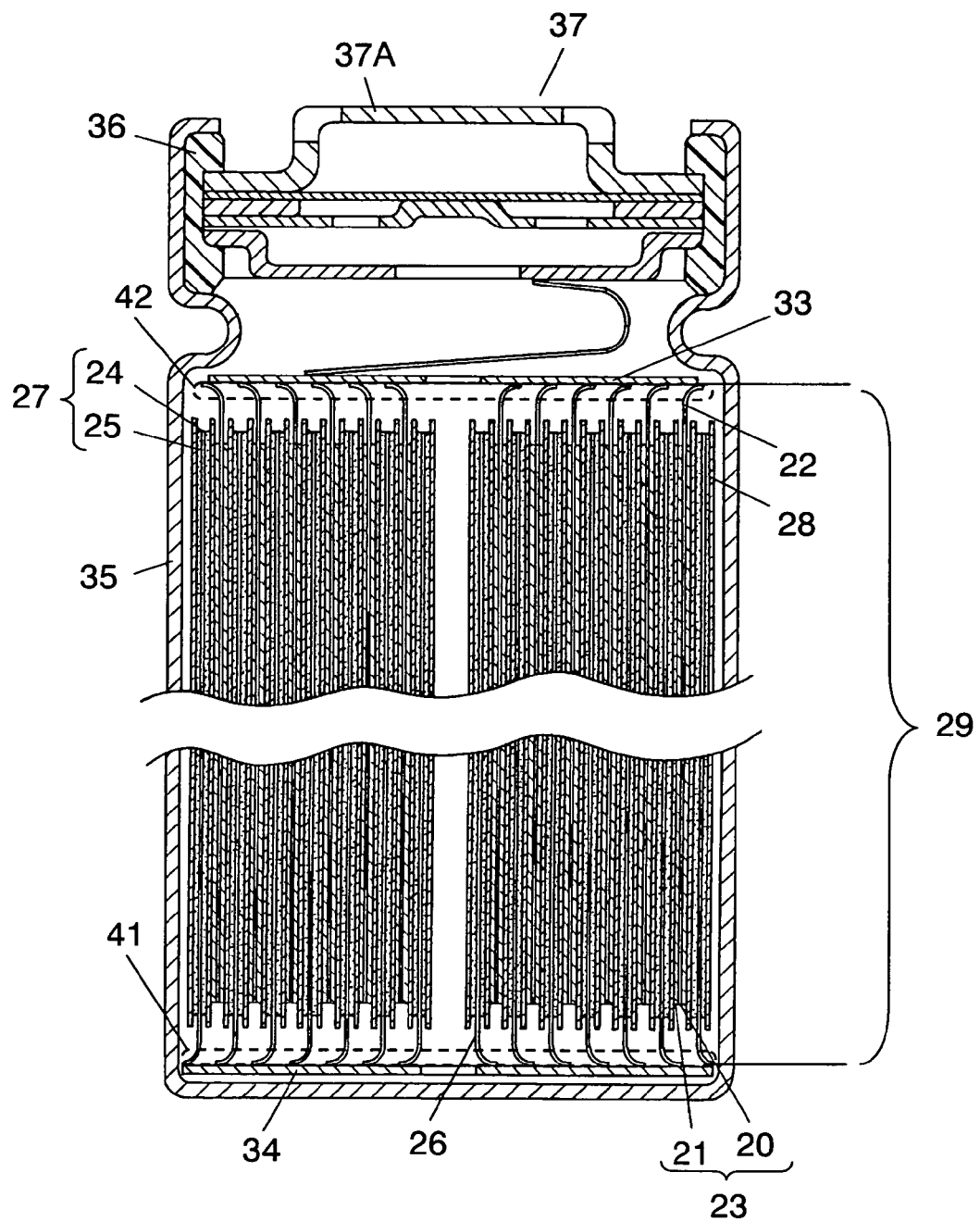
FIG. 1 is a sectional view of a cylindrical lithium-ion rechargeable battery in accordance with an exemplary embodiment of the present invention.
Figure 2A:
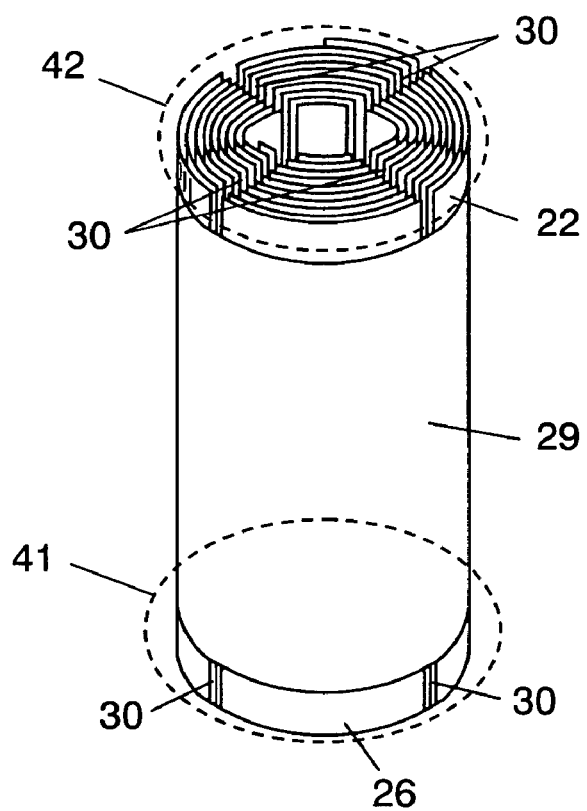
FIG. 2A is a perspective view showing a state before processing of an electrode group of the cylindrical lithium-ion rechargeable battery shown in FIG. 1.
Figure 2B:
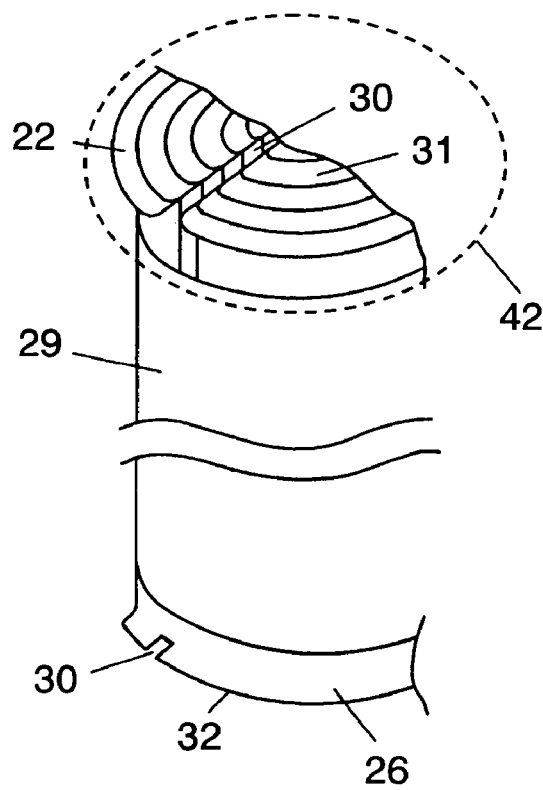
FIG. 2B is a partial perspective view showing a state after the processing of the electrode group shown in FIG. 2A.

FIG. 1 is a sectional view of a sealed rechargeable battery in accordance with an exemplary embodiment of the present invention. FIG. 2A is a perspective view showing a state before processing of an electrode group of the cylindrical lithium-ion rechargeable battery shown in FIG. 1, and FIG. 2B is a partial perspective view showing a state after the processing thereof. In the present embodiment, a cylindrical lithium-ion rechargeable battery will be described as an example of the sealed rechargeable battery.

This sealed rechargeable battery has electrode group 29, an electrolyte (not shown) with which electrode group 29 is impregnated, first collecting plate (hereinafter referred to as "collecting plate") 34, second collecting plate (hereinafter referred to as "collecting plate") 33, case 35, and sealing plate 37. Electrode group 29 has negative electrode 27 as a first electrode, positive electrode 23 as a second electrode, and separator 28 interposed between negative electrode 27 and positive electrode 23. The electrolyte is prepared by dissolving a supporting salt such as lithium salt in non-aqueous solvent.

Negative electrode 27 has first collector (hereinafter referred to as "collector") 24 having first exposed section (hereinafter referred to as "exposed section") 26 at its one end in the width direction, and negative electrode active material layer (hereinafter referred to as "layer") 25 as a first active material layer disposed on collector 24. Collector 24 is formed of copper or nickel foil, for example. Positive electrode 23 has second collector (hereinafter referred to as "collector") 20 having second exposed section (hereinafter referred to as "exposed section") 22 at its one end in the width direction, and positive electrode active material layer (hereinafter referred to as "layer") 21 as a second active material layer disposed on collector 20. Collector 20 is formed of aluminum or stainless foil, for example. Exposed sections 26 and 22 are exposed on opposite sides of electrode group 29. As separator 28, a microporous film made of polyolefin resin such as polypropylene is used. The thickness thereof is about 25 µm, for example.

Collecting plate 34 is welded to first welding section 41 formed of exposed section 26 of wound negative electrode 27, and collecting plate 33 is welded to second welding section 42 formed of exposed section 22 of wound positive electrode 23. Collecting plate 34 is electrically connected to the inner bottom face of case 35 by welding. Case 35 stores electrode group 29 and the electrolyte. Sealing plate 37 has terminal 37A electrically connected to collecting plate 33, and is applied to an opening of case 35 to seal case 35 through gasket 36 made of insulating resin such as polypropylene. Collecting plate 34 is made of copper, nickel, nickel-plated copper, iron or the like, and collecting plate 33 is made of aluminum or the like.

As shown in FIG. 2A, four slits 30 are provided in each of exposed section 22 of collector 20 and exposed section 26 of collector 24 from the winding axis to the outer periphery. In other words, each of first welding section 41 and second welding section 42 has a plurality of radial slits 30. Here, first welding section 41 is a group of exposed section 26 of collector 24, and second welding section 42 is a group of exposed section 22 of collector 20. Exposed section 22 divided into four by slits 30 is folded at a right angle from the winding axis side toward the outer periphery to form flat welding face 31 on second welding section 42 as shown in FIG. 2B. Similarly, exposed section 26 is folded at a right angle from the winding axis side toward the outer periphery to form flat welding face 32 on second welding section 41. On welding faces 31 and 32, disk-like collecting plates 33 and 34 are electrically connected to collectors 20 and 24 at every winding layer by welding, respectively.

A method of manufacturing the sealed rechargeable battery is described hereinafter with a specific example. First, a procedure for manufacturing positive electrode 23 is described. Lithium cobaltate (LiCoO$_2$) powder of 85 parts by weight, carbon powder of 10 parts by weight as a conductive agent, and polyvinylidene fluoride (PVDF) of 5 parts by weight as a binder are mixed. At this time, PVDF is mixed as solution of N-methyl-2-pyrolidone (NMP). The mixture is applied to both faces of collector 20 made of 15-µm-thick and 56-mm-wide aluminum foil by a doctor blade method so as to form 6-mm-wide exposed section 22 on one end in the width direction. The applied mixture is subsequently dried and roll-pressed to produce a 150-µm-thick positive electrode hoop. Thus, layer 21 is formed on collector 20. This positive electrode hoop is cut into a predetermined size to form positive electrode 23.

Negative electrode 27 is produced as follows, for example. Artificial graphite powder of 95 parts by weight and PVDF of 5 parts by weight are mixed. At this time, PVDF is mixed in a form of solution of NMP. The mixture is applied to collector 24 made of 10-µm-thick and 57-mm-wide copper foil so as to form 5-mm-wide exposed section 26 on one end in the width direction. The applied mixture is subsequently dried and roll-pressed to produce a 160-µm-thick negative electrode hoop. Thus, layer 25 is formed on collector 24. This negative electrode hoop is cut into a predetermined size to form negative electrode 27.

The electrolyte is prepared as follows, for example. Ethylene carbonate and ethyl methyl carbonate are mixed at volume ratio of 1:1 so that non-aqueous solvent is prepared. Lithium hexafluorophosphate (LiPF$_6$) is dissolved at 1 mol/L into the non-aqueous solvent.

Then, positive electrode 23 and negative electrode 27 are wound through separator 28 formed of 25-µm-thick and 53-mm-wide microporous film made of polypropylene resin, thereby producing electrode group 29. At this time, positive electrode 23, negative electrode 27, and separator 28 are arranged so that exposed sections 26 and 22 are exposed on opposite sides of electrode group 29 and separator 28 covers layers 21 and 25.

A notching member having radially arranged ceramic blades is pressed by a pressing force of 6N to first welding section 41 and second welding section 42, namely groups of exposed section 26 and exposed section 22. Thus, a plurality of radial slits 30 with a depth of 1 mm are formed. Except for exposed sections 26 and 22, electrode group 29 having slits 30 is held by a resin jig. A ceramic bar having a spherical tip is pressed to exposed sections 22 and 26 in second welding section 42 and first welding section 41 divided by slits 30. Exposed sections 22 and 26 are sequentially folded at right angles from the winding axis side toward the outer periphery of electrode group 29. Thus, flat welding faces 31 and 32 are formed.

Collecting plate 33 as a disk is formed in a 24-mm-diameter donut shape having a 7-mm-diameter hole in its center, for example, by stamping out a 0.2-mm-thick aluminum plate with a press die set. Collecting plate 34 is produced by processing a 0.2-mm-thick copper plate similarly to collecting plate 33, for example.

Collecting plates 33 and 34 are connected by laser welding to welding faces 31 and 32 of electrode group 29 produced as discussed above, respectively. The laser welding of collector 20 and collecting plate 33 is performed at a current of 125 A for a time of 1.2 msec. The laser welding of collector 24 and collecting plate 34 is performed at a current of 95 A for a time of 1.4 msec.

Next, electrode group 29 is inserted into case 35, and collecting plate 34 is connected to the inner bottom face of case 35 by resistance welding. Case 35 is made of iron and plated with Ni, and has a diameter of 26 mm and a height of 65 mm. For mounting sealing plate 37, a groove shape is formed near the opening of case 35. Collecting plate 33 is connected to sealing plate 37 mounted with gasket 36 by laser welding.

In this state, electrolyte of 4.5 $cm^3$ is poured into case 35, and electrode group 29 is impregnated with the electrolyte. After impregnation with the electrolyte, sealing plate 37 is engaged with case 35, and the part near the opening of case 35 is bent to seal case 35. After these procedures, a cylindrical lithium-ion rechargeable battery of the present embodiment having a diameter of 26 mm, a height of 65 mm, and a design capacity of 2600 mAh is completed.

In this structure, flat welding faces 31 and 32 are certainly connected to collecting plates 33 and 34 by welding, respectively. Thus, a stable collecting structure with small resistance is achieved, and the high rate discharge characteristic of the battery is improved. Incidentally, welding faces 31 and 32 are not necessarily required on both sides, and may be disposed on only one side.

Results of evaluating the battery thus completed are described hereinafter. First, a measured result of welding strength of collecting plates 33 and 34 and electrode group 29 is described. Ten electrode groups 29 each of which is welded to collecting plates 33 and 34 are produced. Each electrode group 29 is fixed, collecting plates 33 and 34 are pulled, and the welding strength until peeling is measured. As a result, all welding strengths are 20 N or higher. According to observation of all the peeled parts, collectors 20 and 24 are broken on the welding faces 31 and 32.

Ten cylindrical lithium-ion rechargeable batteries of a design capacity of 2600 mAh are produced. The charge and discharge cycle is performed three times where completed batteries are charged to 4.2 V with a constant current of 1250 mA and discharged to 3.0 V with a constant current of 1250 mA. Then, resistances at alternating current of 1 kHz are measured. The average of the measured resistances of the batteries is 14 mΩ, which is about half the resistance of a conventional lead-type battery. Even when a test of dropping the batteries from the height of 60 cm is repeated 70 times, the maximum of increments of the internal resistances is only 2 mΩ.

Figure 3:
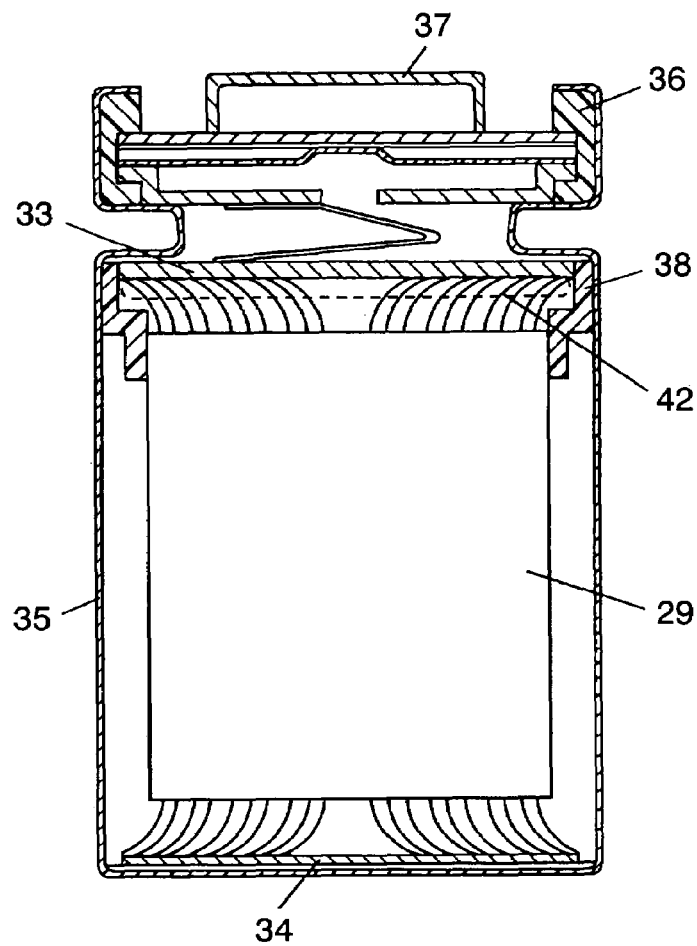
FIG. 3 is a sectional view of another cylindrical lithium-ion rechargeable battery in accordance with the exemplary embodiment.

A more preferable structure of the cylindrical lithium-ion rechargeable battery of the present embodiment is described below. FIG. 3 is a sectional view of another cylindrical lithium-ion rechargeable battery in accordance with the present embodiment. In the structure shown in FIG. 2B, the outer peripheral diameter of welding section 42 can be greater than the outer diameter of electrode group 29. When electrode group 29 is stored in case 35, the outer periphery of welding section 42 may be extremely close to the inner face of case 35 which also serves as an external terminal of the negative electrode. An impact or vibration may therefore cause a short circuit. Therefore, insulating section 38 is preferably disposed at a position corresponding to the outer periphery of welding section 42 as shown in FIG. 3. Thus, the short circuit between case 35 and welding section 42 which are on the opposite electrode sides is prevented, and the reliability of the battery is improved.

Insulating section 38 can be formed by applying insulating resin to the inner face of case 35 at the position corresponding to the outer periphery of welding section 42. Alternatively, insulating section 38 can be formed by applying insulating resin to the outer periphery of welding section 42, or by inserting a previously formed insulating ring into the outer periphery of welding section 42.

Figure 4:
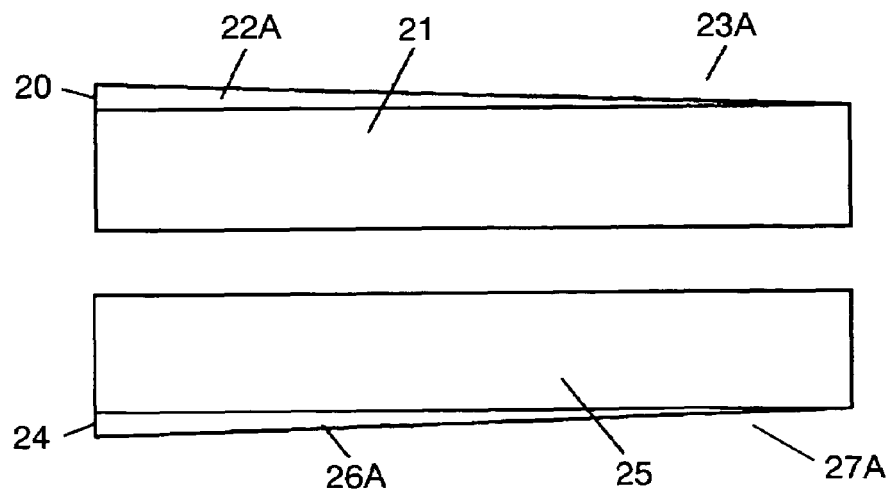
FIG. 4 is a developed view of a positive electrode and a negative electrode of the latter cylindrical lithium-ion rechargeable battery in accordance with the exemplary embodiment.
Figure 5:
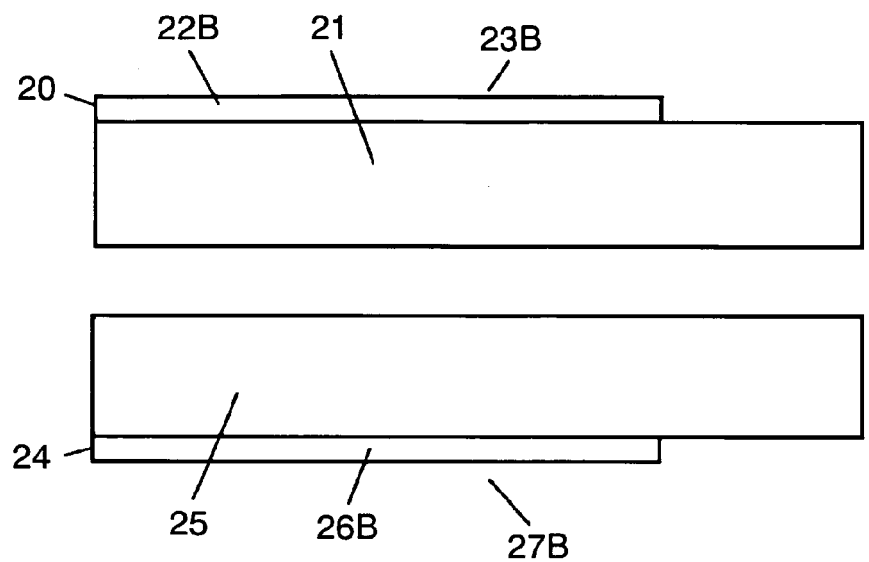
FIG. 5 is a developed view of a positive electrode and a negative electrode of yet another cylindrical lithium-ion rechargeable battery in accordance with the exemplary embodiment.
Figure 6:
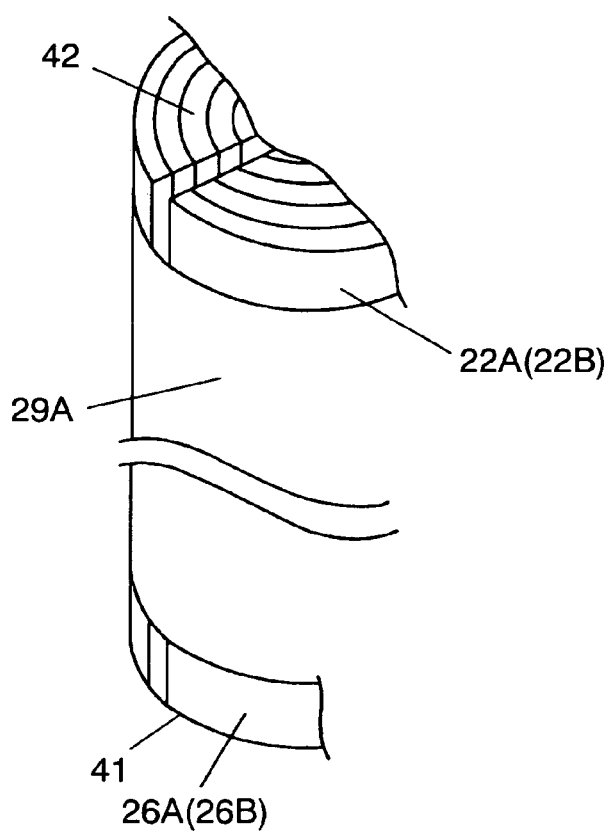
FIG. 6 is a partial perspective view of an electrode group formed of the positive and negative electrodes shown in FIG. 4 or those shown in FIG. 5.
Figure 7A:
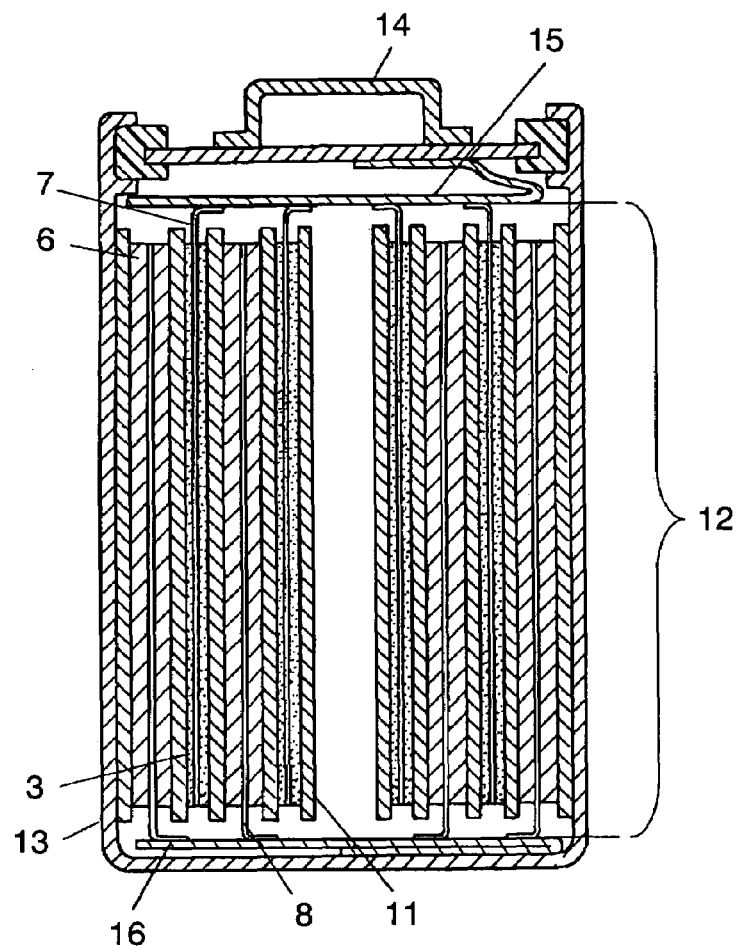
FIG. 7A is a sectional view of a tabless type conventional cylindrical lithium-ion rechargeable battery.
Figure 7B:
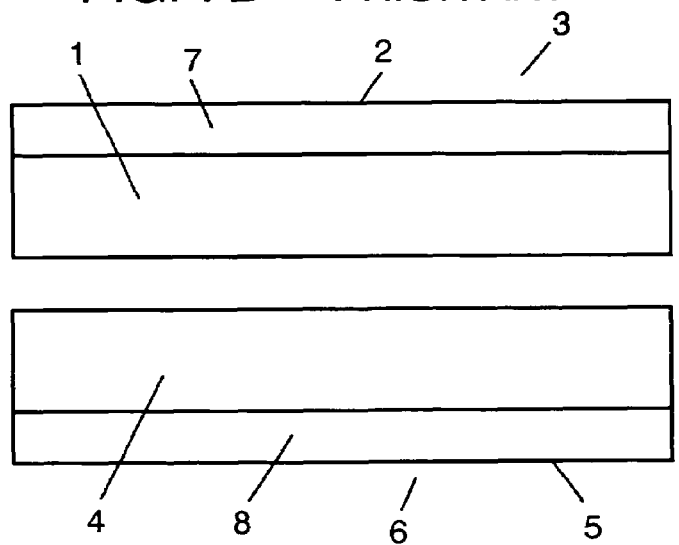
FIG. 7B is a developed view of electrodes of the cylindrical lithium-ion rechargeable battery shown in FIG. 7A.

For preventing the short circuit between case 35 and welding section 42, the outer periphery of welding section 42 may be substantially identical with the outline of electrode group 29. In other words, as shown in FIG. 4, positive electrode 23A and negative electrode 27A are prepared so that the widths of exposed sections 22A and 26A are gradually decreased from the winding center side toward the outer periphery side to substantially eliminate exposed sections 22A and 26A on the outer periphery side. Alternatively, as shown in FIG. 5, positive electrode 23B and negative electrode 27B are prepared so that several turns of exposed sections 22B and 26B on the outer periphery side are eliminated. In either of these structures, when electrode group 29A is formed by spirally winding the electrodes, the outer periphery of welding section 42 hardly projects outward with respect to the outer diameter of electrode group 29A as shown in FIG. 6. Here, welding section 42 is formed by folding exposed section 22A or 22B from the winding axis side toward the outer periphery side. When electrode group 29A is structured in this manner, the short circuit between case 35 and welding section 42 is prevented without using insulating section 38 shown in FIG. 3.

In this structure, connection of collectors 20 and 24 to collecting plates 33 and 34 becomes insufficient on the outer periphery side, or the current distribution becomes somewhat non-uniform. However, these problems are negligible compared with a conventional case of connecting to a non-flat welding face.

When the outer periphery of welding section 41, which plays a leading role when electrode group 29A is inserted into case 35, is also set to be identical with the outline of electrode group 29A as discussed above, the insertion into case 35 also becomes easy.

The first electrode is assumed to be a negative electrode and the second electrode is assumed to be a positive electrode in the present embodiment; however, the opposite structure can be used. In other words, the first electrode may be assumed to be a positive electrode and the second electrode may be assumed to be a negative electrode.

A cylindrical lithium-ion rechargeable battery is described as the sealed rechargeable battery in the present embodiment; however, the present invention can be applied to another high-power sealed rechargeable battery such as a nickel-cadmium rechargeable battery or a nickel-metal-hydride rechargeable battery, and a similar advantage is produced.

Since the sealed rechargeable battery in the present invention has an excellent collecting structure of the electrodes, the internal resistance is small. Therefore, the sealed rechargeable battery in the present invention can be applied to drive an electric tool or an electric vehicle requiring high power.

What is claimed is:

1. A sealed rechargeable battery comprising:
    an electrode group including
        a first electrode having a first collector provided with a first exposed section at one end thereof in the width direction, and a first active material layer disposed on the first collector,
        a second electrode having a second collector provided with a second exposed section at one end thereof in the width direction, and a second active material layer disposed on the second collector, and a separator interposed between the first electrode and the second electrode, the first electrode and the second electrode being wound together, about a winding axis, with the separator interposed therebetween so that the first exposed section and the second exposed section are exposed on axially opposite sides of the electrode group;

an electrolyte, the electrode group being impregnated with the electrolyte;

a first collecting plate welded to a first welding section formed of the first exposed section of the wound first electrode;

a second collecting plate welded to a second welding section formed of the second exposed section of the wound second electrode;

a case configured to store the electrode group and the electrolyte, the first collecting plate being coupled to an inner bottom face of the case; and a sealing plate, having a terminal, coupled to the second collecting plate, the sealing plate being applied to an opening of the case;

wherein a plurality of radial slits are provided in at least one of the first welding section and second welding section; and wherein, in said at least one of the first welding section and second welding section having the slits, at least one of the first exposed section and second exposed section is folded outwardly in a direction from the winding axis toward an outer periphery of the electrode group, such that said at least one of the first exposed section and second exposed section forms a flat welding face.

2. The sealed rechargeable battery according to claim 1, further comprising an insulating section disposed between an outer periphery of the second welding section and the case.

3. The sealed rechargeable battery according to claim 1, wherein an outer periphery of the second welding section is substantially identical with an outline of the electrode group.

4. The sealed rechargeable battery according to claim 3, wherein width of the second exposed section gradually decreases from the winding axis toward the outer periphery of the electrode group.

5. The sealed rechargeable battery according to claim 3, wherein the second exposed section is disposed only on an inner periphery side of the winding.

6. The sealed rechargeable battery according to claim 1, wherein said at least one of the first exposed section and second exposed section is folded radially outwardly in such a manner as to include a substantially axially-extending portion and a substantially radially-extending portion, said substantially radially-extending portion extending from said substantially axially-extending portion in a radially outward direction relative to said winding axis.

* * * * *